Nov. 29, 1938.  W. SEYERLE  2,138,618
INTERNAL COMBUSTION ENGINE FOR MOTOR CARS
Filed July 8, 1936  4 Sheets-Sheet 1

Inventor

ATTORNEY

Inventor

Nov. 29, 1938. W. SEYERLE 2,138,618
INTERNAL COMBUSTION ENGINE FOR MOTOR CARS
Filed July 8, 1936 4 Sheets-Sheet 3
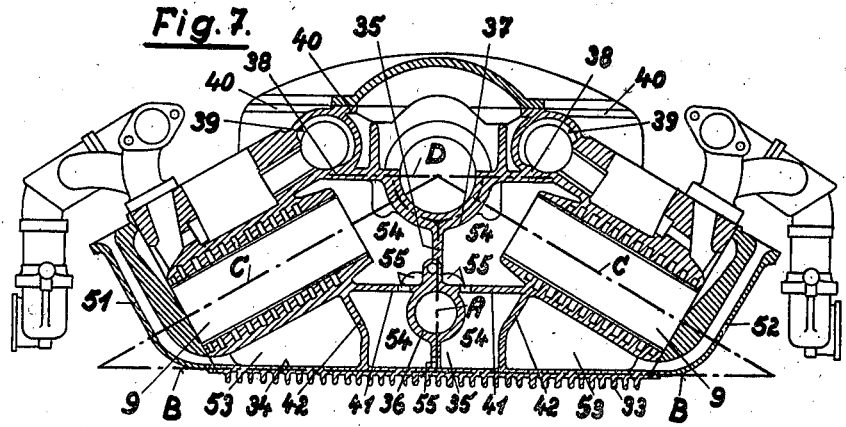
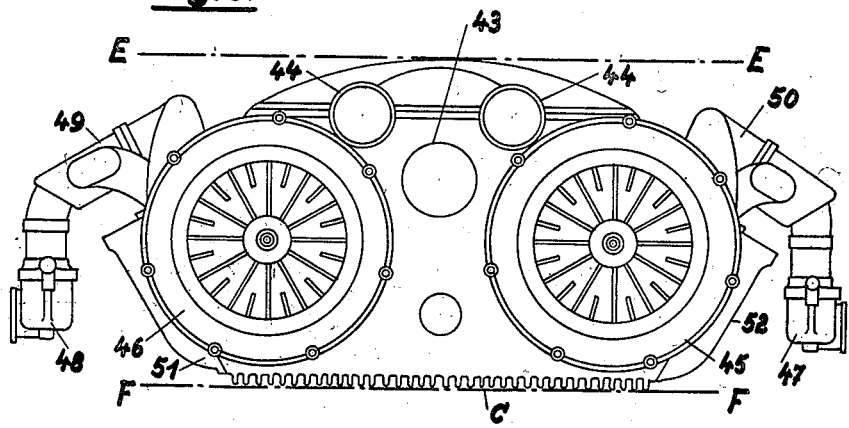
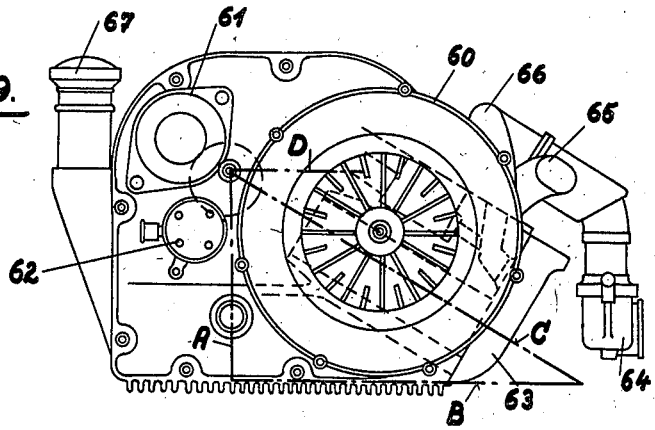
Inventor Nov. 29, 1938.   W. SEYERLE   2,138,618
INTERNAL COMBUSTION ENGINE FOR MOTOR CARS
Filed July 8, 1936   4 Sheets-Sheet 4

Inventor

ATTORNEY

Patented Nov. 29, 1938

2,138,618

UNITED STATES PATENT OFFICE 2,138,618

INTERNAL COMBUSTION ENGINE FOR MOTOR CARS

Wilhelm Seyerle, Waldenbronn, near Esslingen-on-the-Neckar, Germany, assignor to Daimler-Benz Aktiengesellschaft, Stuttgart-Unterturkheim, Germany Application July 8, 1936, Serial No. 89,516
In Germany March 20, 1935

19 Claims. (Cl. 180—54)

The present invention relates to improvements in internal combustion engines, especially such as are adapted for use in connection with motor cars. The invention is intended especially for such motor cars which have a plurality of driven wheel axles, and one of its main characteristic features in the provision of suspended cylinders arranged in the form of an inverted V. The internal combustion engine drives the car axles through a change-speed gear by means of a driving shaft passing through the free angular space between the cylinders.

It is suitable to the purpose in view to let the driving shaft extend through a hollow main shaft or subsidiary shaft of said change-speed gearing. A preferred construction of the invention is such a one in which a coupling is arranged behind the internal combustion engine, and the change-speed gearing is arranged behind said coupling, and in which preferred constructional form, besides, a driving member for one of the car axles is arranged between the change-speed gearing and the engine below the said coupling.

Another feature of the invention is that the space between the cylinders is utilized for the reception of a container for a cooling agent or for a lubricant or for fuel, whereas the walls bounding said space, in connection with a plate bridging it in the height of the cylinder ends, and in co-operation with intermediate walls or stays in the said space, and in conjunction with the cylinders themselves, constitute a framework-like diagonal bond. The entire arrangement and combination of all these members appears as a flat block having just such a height that valve control members which may be provided for, at the internal combustion engine, as well as other parts, such as the carburetter, an air-filter, a fuel-injection pump, an ignition-distributor, and the like, can just be housed at the frontal side of the driving gearing, preferably within a separate casing there located.

Another particular feature is the arrangement of the internal combustion engine directly behind the rear seats and the rear driven car axle in such a deep position that the driving shaft can drive said axle from below.

The invention is illustrated diagrammatically and by way of example on the accompanying drawings in which:

Figure 7 shows a transverse section through the cylinder group of the motor;

Figure 8 is a front view of the blower side of the motor shown in Fig. 7;

Figure 9 shows a modified type of motor with a series of suspended cylinders;

Figure 1:
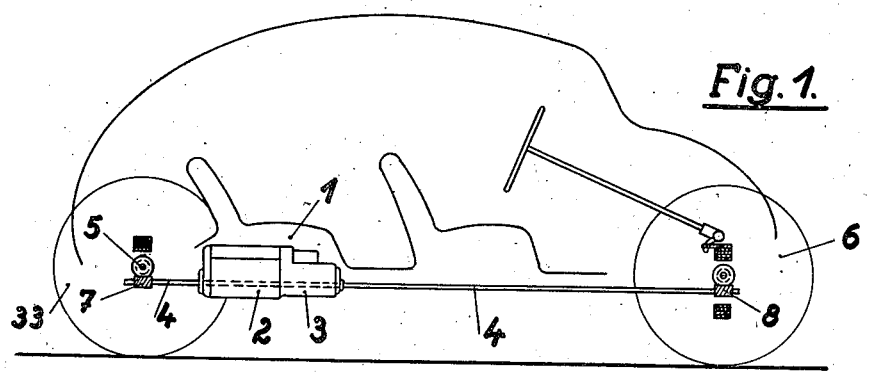
Figure 1 is a vertical longitudinal partial section through a car provided with the present invention.

As appears from Fig. 1, the car comprises, among other members, a motor 2, and gearing block 3 arranged between the seats 1 and the rear axle 5, said block driving the rear swinging axle 5 and two parallel guided front wheels 6 by means of a continuous shaft 4 positioned beneath the wheel axles. The connections of the shaft with said axles are illustrated as worm gears 7 and 8.

Figure 2:
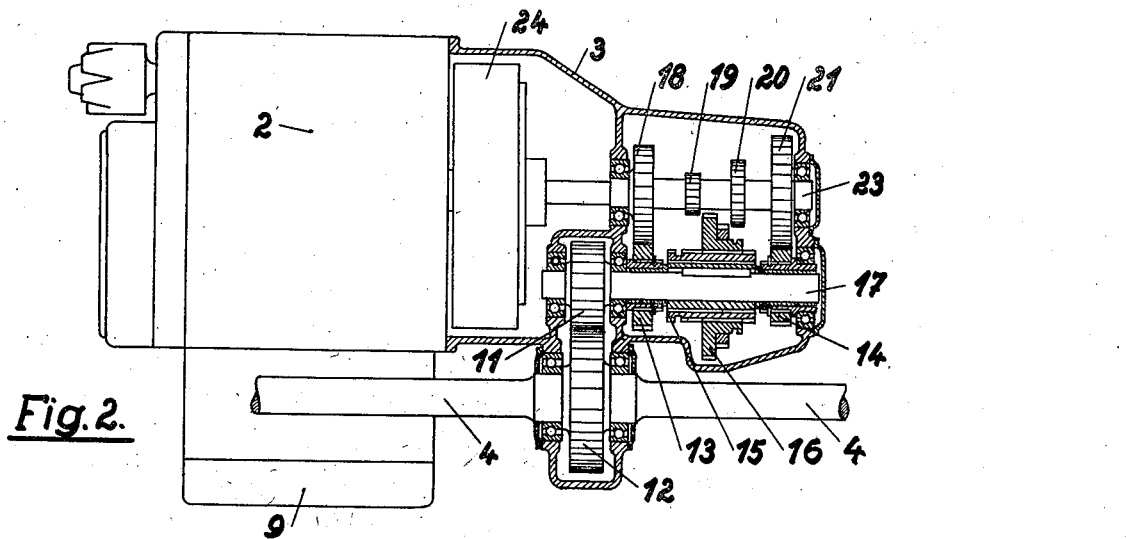
Figure 2 is a partial side view of the motor, including a side view of the driving gearing shown partially in cross-section.

From Fig. 2, which is drawn to an enlarged scale, it appears that the cylinders 9 of the motor are arranged like the legs of an inverted V and that the driving shaft 4 is passed through the open space between the cylinders. The shaft 4 is driven through gears 11 and 12 by means of a change-speed gearing. The latter includes the change-speed wheels 13 and 14, as well as 15 and 16 which are slidably keyed on an intermediate shaft 17 and the driving wheels 18, 19, 20 and 21 arranged on the elongated crank-shaft 23 of the motor. On the crank-shaft 23 is, furthermore, provided a coupling 24.

Figure 3:
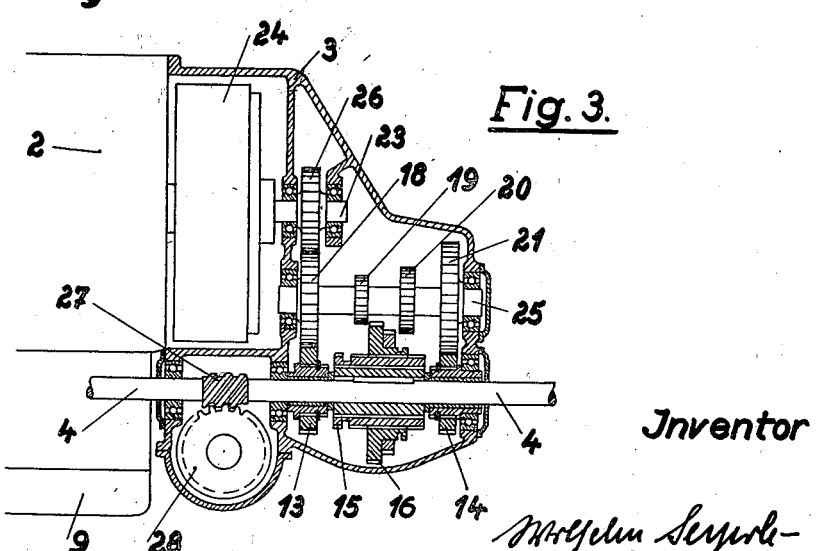
Figure 3 is a representation similiar to Fig. 2 and shows a modification of the gearing.
Figure 4:
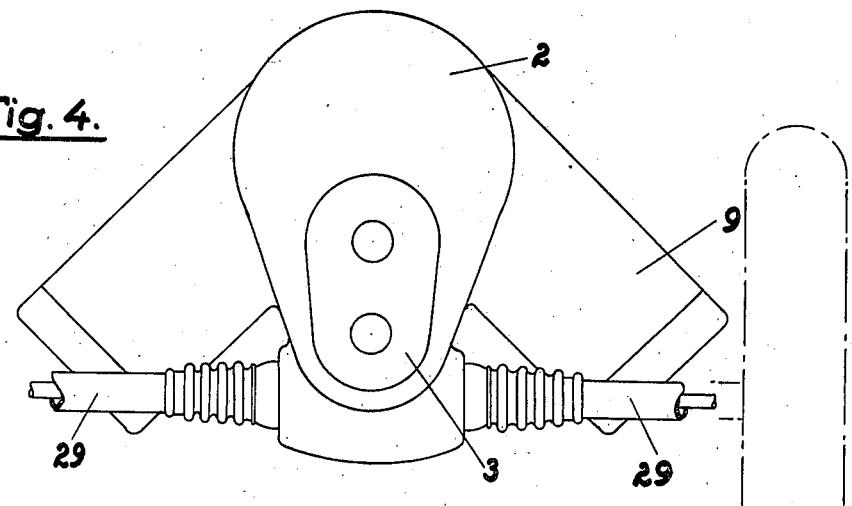
Figure 4 is a front view of the casings illustrated in Fig. 3, in combination with certain adjacent parts.

In the modified constructional form illustrated in Figs. 3 and 4 the driving shaft 4 is passed directly through the change-speed gearing block and carries the change-speed wheels 13, 14, 15 and 16. The driving wheels 18, 19, 20 and 21 of the change-speed gearing are arranged on an intermediate shaft 25 and are driven by means of a spur-wheel 26 secured to the crank-shaft 23. If there is only a small gap between the motor and the driving shaft, the wheel 26 may be dispensed with, as is the case, for example, in Fig. 2. There is in addition in Figs. 3 and 4 the driving gearing 27, 28 for a car axle 29 provided between the motor 2 and gearing block 3 (Fig. 3) beneath the coupling 24.

Figure 5:
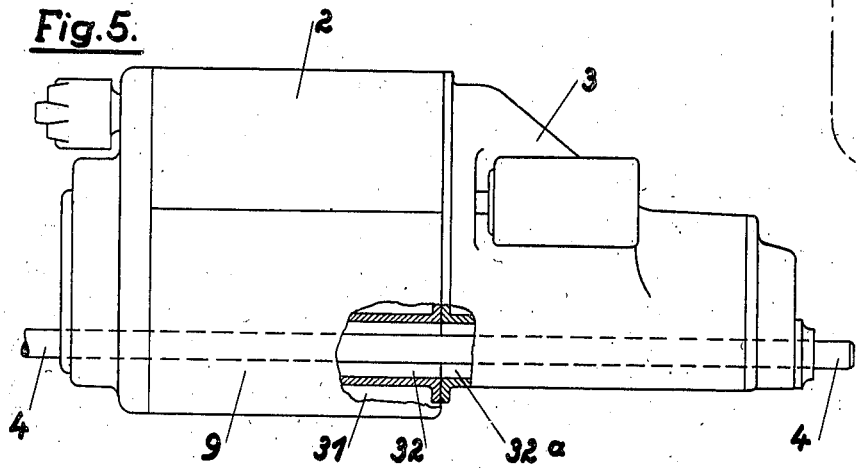
Figure 5 is a side view of a driving block having a shaft tunnel according to this invention.
Figure 6:
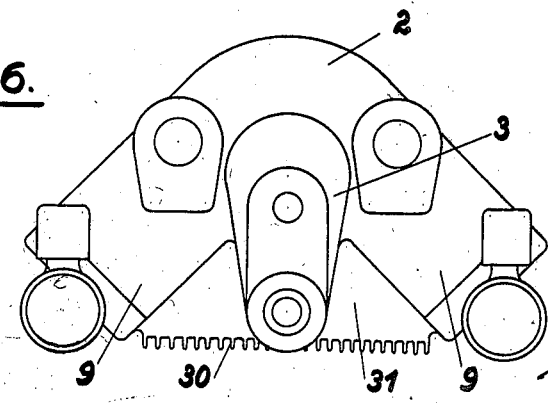
Figure 6 is a front view of the block shown in Fig. 5.

In Figs. 5 and 6 an oil-chamber 31 provided with cooling ribs 30 is arranged between the cylinders 9, and through it extends a tunnel 32 (Fig. 5) through which passes the shaft 4. The tunnel 32 may extend through the gearing block 3, as at 32ᵃ in Fig. 5, and may be utilized in supporting the shaft 4.

In the constructional form shown in Fig. 7 the series of the cylinders 9 which are again arranged in the manner of a V, enclose an angle of about 120° and are inclined relatively to a lower horizontal line by about 30°. The space between these rows of cylinders is bridged by a plate 34 having cooling fins 33. From the middle of this plate a vertical web 35 extends upwardly and supports in its middle portion a tunnel 36 for the passage of the driving shaft for the car axles, and supports furthermore at its upper end a bearing 37 for the crank-shaft. The bearing for the crank-shaft is, in its lower portion, transformed into approximately horizontal webs 38. These are connected with the bearings 39 for the valve control shafts and terminate finally in the shape of cover ribs 40 for the cover of the motor casing. There may be, in addition, horizontal strengthening ribs 41 and substantially vertical webs 42.

According to this invention the cylinders 9 form, together with the plate 34 and the webs or ribs 35, 37, 38 and 40, a rigid diagonal system A, B, C, D which is particularly stiffened by the ribs 41 and 42 which constitute additional supports therefor. The entire arrangement and combination of all these members (Fig. 8) is so designed that the generator 43, the distributors 44, the blowers 45 and 46 and the carburetters 47 and 48 with their pipes 49 and 50 are located within a space bounded by two horizontal straight lines E—E and F—F. The upper line E—E touches the uppermost point of the coupling or flywheel, and the lower line F—F is determined by the lowermost point of the range of the crank-drive motion, or by the lower wall of the receptacle containing the lubricating oil or the cooling agent, or by the lowermost rim-edge of the cylinder covers 51 and 52.

Figure 10:
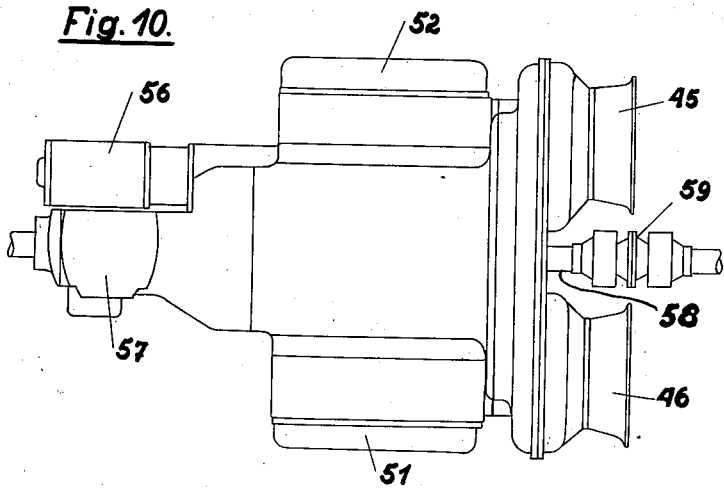
Figure 10 is a plan of the motor shown in Fig. 7.

In the constructional form shown in Fig. 7 the spaces 53 constitute passages for the cooling air. The spaces 54 serve for the reception of lubricating oil. The proper circulation of the oil is insured by the apertures 55 provided in the walls and the webs. If the cylinders are cooled by water, the spaces 53 can also be utilized for the reception of oil. The two blowers 45 and 46 are located on the cover-side of the entire arrangement (Fig. 10). On the opposite side the starter 56 and gearing 57 are secured in place by flanges. The driven shaft 58 is provided with a joint 59 located between the two blowers. In certain cases it is possible to do also with only one blower.

Figure 11:
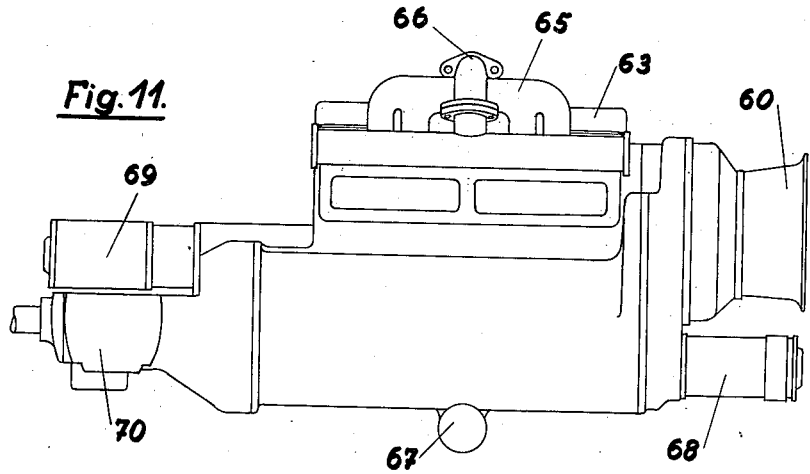
Figure 11 is a plan of the motor shown in Fig. 9.

The principle disclosed by the diagonal bond according to this invention can be utilized also where there is only one row of cylinders. An example of this is shown in Figs. 9 and 11 which can be regarded, in fact, as a division of the example shown in the Figs. 7 and 8. In Figs. 9 and 11 60 denotes the blower, 61 the generator, 62 the distributor, 63 the cylinder-head, 64 the carburetter, 65 the intake pipe, 66 the exhaust pipe, 67 an oil-filling conduit. With this constructional form the diagonal system ABCD is also carried out. The arrangement of the blower 60 (Fig. 11), the starter 68, the generator 69 and the gearing 70 is similar to that of Fig. 7.

The arrangement described above has the extremely advantageous result of a compact, low structure which is very stiff and free of unwanted vibrations, whereby the engine is extraordinarily quiet. The present improved construction is also particularly favorable for air-cooled cylinders as the supply passages for the cooling air and for conducting it away can be conveniently integrally cast. Although the most favorable arrangement of the cylinders has been found to be that in which they enclose an angle of about 90° to 100°, it is not necessary in order to carry out the principles of this invention, that these cylinders be positioned as an inverted V and they may, on the other hand, if desirable, be positioned vertically or at any other convenient angle. Arranging the cylinders as an inverted V does have the advantage that in this case the center of gravity of the driving gearing will be positioned very low. In the inverted V position of the cylinders more favorable cooling of the cylinders can be accomplished and the oil chamber can be positioned low.

A further advantage of my construction is that the large blowers for cooling can be housed on the framework without extending beyond the boundary contour of the engine.

The arrangement of the drive shaft intermediate the cylinders makes possible the driving of the front or rear axles or both of them without the provision of separate intermediate and connecting members. Furthermore, such wheel axles can be positioned, within wide limits, at any desired height. The compact arrangement of the engine and the driving gears also makes possible a convenient mounting thereof as, for example, beneath the seats of the vehicle, although it is obvious that it may be placed in any other desired position if convenient. While the driving unit has been illustrated with the drive gearing positioned toward the front of the vehicle, it is also possible to reverse this arrangement in which case the blowers are assisted in their work by the column of air moving upon them due to the motion of the vehicle.

The driving unit described may be used in connection with any type of wheel suspension. It is especially advantageous with a suspension having parallel moving front wheels and pendulum mounted rear wheels. With such an arrangement the axis for the transverse oscillation or for the lateral inclinations of the body respectively, extends from a point lying in the track between the front wheels to a point lying about in the height of the connection of the pendulum axles at the under frame between the rear wheels, so that the transverse oscillations, owing to their rearward and obliquely upward direction, approach the center of gravity of the car. As a result of this arrangement there will be a slight lateral inclination of the car in going about curves or upon transverse oscillations, and wobbling of the front wheels is prevented.

Accordingly, while several forms of the invention have been described above, I do not intend to limit myself to these except as is required by the claims which follow.

I claim:

1. In an internal combustion engine, in combination, two cylinders arranged in V-form, a stiffening plate bridging the space between the cylinder ends and forming a triangle together with the cylinders, a groove-shaped supporting member for the crank-shaft of the engine, this member connecting the cylinder walls at the vertex of said triangle; and a web wall extending through the angular space between the cylinders and being connected at the one side to said groove-forming member and at the other side to said stiffening plate and being located substantially vertical relatively to this plate, the arrangement being such that the said groove-forming member and the said stiffening plate constitute the horizontal tensile ties, the web wall a vertical tensile tie, and the cylinders the diagonals of a framework-like bond.

2. In an internal combustion engine, in combination, an oblique cylinder extending from above to below, and a wall-forming member forming a substantially rectangular spatial corner arranged relatively to said oblique cylinder in such a manner that a leg section of said member constitutes a lateral vertical web and the other leg section of the said member constitutes a lower horizontal chord, and the entire arrangement and combination of the parts stated forms, together with the said oblique cylinder, a framework-like diagonal bond.

3. In an internal combustion engine, in combination, an oblique cylinder, a wall-forming member in the shape of a substantially rectangular spatial corner, and two frontal walls forming with said member a receptacle for a cooling medium, lubricant, or fuel, said member being so arranged relatively to the said oblique cylinder that one leg section of said corner constitutes a substantially vertical web and the other leg section constitutes a substantially horizontal chord, and all these members, including the cylinder, form a framework-like diagonal bond.

4. In an internal combustion engine, in combination, two cylinders arranged in V-form relatively to one another; a chord plate bridging the space between the cylinder ends and forming a triangle together with the cylinders; a web wall extending through the angular space between the cylinders and contacting with said chord plate; and stiffening ribs or stiffening walls located in the space sections divided by the web wall between the cylinders, the arrangement being such that the said chord plate, the said web wall and said stiffening ribs or walls form, together with the cylinders, a framework-like diagonal bond.

5. In an internal combustion engine for driving a motor-car, in combination, two cylinders arranged in V-form, a driving shaft driven in turn by said engine and adapted for driving in turn one or several car axles; a receptacle suited for holding a cooling agent, lubricant or fuel, and being arranged in the space between the two cylinders; said receptacle including a plate bridging the space between the cylinder ends and forming a triangle together with the cylinders; a tunnel pipe extending through said receptacle and having said shaft extend through it; and a web wall extending through the said receptacle and contacting with said plate and having an aperture for the passage of the said shaft and which, furthermore, is so located that it constitutes, together with the cylinders and the walls of said receptacle, especially with the said plate of the same, and with said web wall, a framework-like diagonal bond.

6. In an internal combustion engine, having a crank shaft, in combination, two suspended cylinders arranged in V-form relatively to one another, a driving shaft driven by said engine and intended to drive, in turn, one or several car axles, a receptacle filling the space between the two cylinders and having a plate bridging the space between the cylinder ends and forming a triangle together with cylinders; a tunnel pipe extending through said receptacle substantially parallel to the crank-shaft of the engine and having the driving shaft thereof extend through it; a web wall likewise extending through the space between the cylinders and contacting with said plate and having an aperture for the passage of said driving shaft and being so arranged that the cylinders form, together with the receptacle walls and especially with the said plate of the receptacle, a framework-like diagonal bond.

7. In an internal combustion engine, in combination, a plurality of parallel obliquely positioned cylinders, a motor housing including end walls, a substantially vertical web and a substantially horizontal member connected thereto, said end walls, web and member forming a receptacle, means rigidly interconnecting said cylinder with the free ends of said web and member, said web member and cylinders thereby forming a rigid integral framework, a drive shaft adapted to drive one or more car axles, means for operatively connecting said shaft to be driven by said engine, and a tunnel pipe extending through said receptacle at one side of said cylinders and adapted to receive said driving shaft.

8. In an internal combustion engine, in combination, two cylinders arranged in V-form relatively to one another; a chord plate bridging the space between the cylinder ends and forming a triangle together with the cylinders; and a web plate extending through the angular space between the cylinders and contacting with said chord plate, these members forming a framework-like diagonal bond having such a breadth and height, that devices appertaining to the internal combustion engine, such as valve control members, a generator, an ignition distributor, a carburetter, an air-filter, and the like, can be housed, together with the requisite pipes and conduits, in a space bounded by the upper and the lower contour line of a vertical frontal view of the internal combustion engine and by a straight line touching said contour lines, as set forth.

9. In an internal combustion engine, in combination, two cylinders in V-form relatively to one another, a chord plate bridging the space between the cylinder ends and forming a triangle together with the cylinders, a web wall extending through the angular space between the cylinders and contacting with the chord plate and forming with it and the cylinders a framework-like diagonal bond of such a breadth and height that the requisite devices for the operation of the engine, such as valve control members, carburetter, ignition-distributor, generator, air filter, and the like, including the requisite pipes and conduits, can be housed within a space bounded by a straight line touching the upper and the lower portion of the contour line of a vertical front-view of the driving aggregate of the internal combustion engine, and a casing provided at a frontal side of the engine and being adapted to receive the said requisite appertaining parts.

10. In an internal combustion engine, in combination, two cylinders arranged in V-form relatively to one another, a chord plate bridging the space between the cylinder ends and forming a triangle together with the cylinders; a web plate extending through the angular space between the cylinders and contacting with said chord plate, the cylinders and said plates forming together a framework-like diagonal bond; and a driving shaft driven in turn by the internal combustion engine and adapted to drive in turn one or several car axles, said driving shaft extending through the space between the two cylinders, said diagonal bond being provided with a passage for the said shaft transmitting power to the car axles.

11. In an internal combustion engine for motor cars, in combination, two suspended cylinders arranged in V-form relatively to one another, a driving shaft for one or several car axles, a second shaft transmitting power from said engine to said driving shaft, the latter extending through the space between the cylinders; a coupling located behind the internal combustion engine, a change-speed gearing behind said coupling, and driving members intended to drive one of the car axles and being located between the motor and the change-speed gearing below the coupling.

12. In an internal combustion engine, in combination, a pair of cylinders positioned like the legs of a V, means for attaching said cylinders to one another at their approaching ends, a stiffening plate bridging the extended cylinder ends, said plate and cylinders thereby forming an integral triangle, and a wall substantially perpendicular to said plate and rigidly connecting the same with the apex of said triangle, said cylinders, plate and wall thereby forming a rigid integral structure.

13. The combination according to claim 12 in which the means for attaching the cylinders at their approaching ends includes a bearing member adapted to support the engine crankshaft, and in which said wall is rigidly attached to said bearing member substantially at the apex of said triangle.

14. In an internal combustion engine, in combination, an obliquely positioned cylinder, and a pair of walls perpendicular to one another and respectively attached to the ends of said cylinder, said walls and cylinder thereby forming a rigid integral triangle of which the cylinder is the hypotenuse.

15. The combination according to claim 12, in combination with end plates on said engine, said end plates, cylinders and stiffening plate forming a receptacle adapted to receive a cooling agent, lubricant or fuel for said engine.

16. The combination according to claim 14, in combination with end plates on said engine, said end plates, walls and cylinder forming a receptacle adapted to receive a cooling agent, lubricant or fuel for said engine.

17. The combination according to claim 14 in which the angle of the cylinders with said stiffening plate is substantially 30° to 45°.

18. The combination according to claim 12 in which said perpendicular wall includes a tunnel adapted to receive said driving shaft.

19. The combination according to claim 7 in which the means for operatively connecting the engine to the drive shaft, includes a clutch and speed-change gearing.

WILHELM SEYERLE.